(12) United States Patent
Mukai

(10) Patent No.: US 10,894,444 B2
(45) Date of Patent: Jan. 19, 2021

(54) PNEUMATIC TIRE

(71) Applicant: SUMITOMO RUBBER INDUSTRIES LTD., Kobe (JP)

(72) Inventor: Yu Mukai, Kobe (JP)

(73) Assignee: SUMITOMO RUBBER INDUSTRIES LTD., Kobe (JP)

(*) Notice: Subject to any disclaimer, the term of this patent is extended or adjusted under 35 U.S.C. 154(b) by 337 days.

(21) Appl. No.: 15/868,059

(22) Filed: Jan. 11, 2018

(65) Prior Publication Data

US 2018/0207988 A1    Jul. 26, 2018

(30) Foreign Application Priority Data

Jan. 24, 2017    (JP) ................................ 2017-010421

(51) Int. Cl.
| | |
|---|---|
| *B60C 9/22* | (2006.01) |
| *B60C 9/28* | (2006.01) |
| *B60C 11/00* | (2006.01) |
| *B29D 30/70* | (2006.01) |
| *B29D 30/30* | (2006.01) |
| *B60C 9/00* | (2006.01) |
| *B60C 3/04* | (2006.01) |
| *B60C 11/01* | (2006.01) |
| *B60C 9/20* | (2006.01) |

(52) U.S. Cl.
CPC ........ *B60C 9/2204* (2013.01); *B29D 30/3028* (2013.01); *B29D 30/70* (2013.01); *B60C 9/0042* (2013.01); *B60C 9/28* (2013.01); *B60C 11/0083* (2013.01); *B60C 3/04* (2013.01); *B60C 11/01* (2013.01); *B60C 2009/0035* (2013.01); *B60C 2009/2016* (2013.01); *B60C 2009/2035* (2013.01)

(58) Field of Classification Search
CPC .......................... B60C 9/2204; B60C 11/0083
See application file for complete search history.

(56) References Cited

U.S. PATENT DOCUMENTS

| | | | |
|---|---|---|---|
| 5,200,006 A  * | 4/1993 | Takehara .................. | B60C 3/04 152/454 |
| 2006/0118220 A1* | 6/2006 | Nguyen .................. | B60C 11/00 152/209.14 |
| 2013/0160915 A1* | 6/2013 | Isaka ..................... | B60C 9/2204 152/527 |

FOREIGN PATENT DOCUMENTS

| | | | |
|---|---|---|---|
| JP | 2003182307 | * | 7/2003 |
| JP | 2012-46061 A | | 3/2012 |

OTHER PUBLICATIONS

JP2003182307 translation (Year: 2003).*

* cited by examiner

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

In a tire 2, a band 14 has a helically wound structure in which a strip 26 having a cord 28 is wound in a circumferential direction. The band 14 includes a center portion C disposed at a center in an axial direction, and a shoulder portion S disposed outward of the center portion C in the axial direction. A pitch Pc of the strip 26 in the center portion C is not less than 2.0 times a width W of the strip 26 and not greater than 2.5 times the width W. A pitch Ps of the strip 26 in the shoulder portion S is not less than 0.8 times the width W of the strip 26 and not greater than 1.2 times the width W.

7 Claims, 4 Drawing Sheets

PNEUMATIC TIRE

This application claims priority on Patent Application No. 2017-010421 filed in JAPAN on Jan. 24, 2017. The entire contents of this Japanese Patent Application are hereby incorporated by reference.

BACKGROUND OF THE INVENTION

Field of the Invention

The present invention relates to pneumatic tires.

Description of the Related Art

Tires include bands outside belts in the radial direction in order to reinforce the belts in many cases. The band has a helical structure in which a strip including a cord is wound almost in the circumferential direction. The band holds the belt. The band contributes to stiffness of the tire.

Study for a structure of a band is disclosed in JP2012-46061. In the band, a winding density of a cord in the center portion, in the width direction, of the band is less than a winding density of the cord at the end portion of the band. Thus, pass-by noise is reduced in addition to durability at a high speed and flat spot resistance performance being assured in the tire.

When an influence of a band on stiffness of a tire can be appropriately controlled, the tire allows ride comfort to be further improved. Further, a band also exerts an influence on steering stability such as responsiveness and cornering stability. A band that further contributes to improvement of ride comfort and steering stability, is required.

An object of the present invention is to provide a tire that provides excellent ride comfort and steering stability.

SUMMARY OF THE INVENTION

A pneumatic tire according to the present invention includes: a tread that forms a tread surface which comes into contact with a road surface; and a band disposed inward of the tread in a radial direction. The band has a helically wound structure in which a strip having a cord is wound in a circumferential direction. The band includes a center portion disposed at a center in an axial direction, and a shoulder portion disposed outward of the center portion in the axial direction. A pitch Pc of the strip in the center portion is not less than 2.0 times a width W of the strip and not greater than 2.5 times the width W. A pitch Ps of the strip in the shoulder portion is not less than 0.8 times the width W of the strip and not greater than 1.2 times the width W.

The inventors have studied the structure of the band. As a result, the inventors have found that, when a pitch of the strip of the band at the center in the axial direction, and a pitch of the strip at the end side in the axial direction are made appropriate, ride comfort and steering stability are improved. In the band of the tire according to the present invention, the pitch Pc of the strip is not less than 2.0 times the width W of the strip and not greater than 2.5 times the width W, in the center portion disposed at the center in the axial direction. The pitch Ps of the strip is not less than 0.8 times the width W of the strip and not greater than 1.2 times the width W, in the shoulder portion disposed outward of the center portion in the axial direction. The structure of the band effectively contributes to ride comfort and steering stability exhibited by the tire. The tire provides excellent ride comfort and steering stability.

Preferably, a width Ls of the shoulder portion is not less than 16% of a width Lb of the band and not greater than 30% of the width Lb, in the axial direction.

Preferably, the pitch Pc of the strip in the center portion is uniform.

Preferably, on a cross-section perpendicular to the circumferential direction, a profile of the tread surface has a first arc C1 that intersects an equator plane, and a second arc C2 that contacts with the first arc C1. A ratio (R1/R2) of a curvature radius R1 of the first arc C1 to a curvature radius R2 of the second arc C2 is not less than 210% and not greater than 250%.

Preferably, when A represents a contact point at which the first arc C1 and the second arc C2 contact with each other, a ratio (Wa/Wt) of a distance Wa from the equator plane to the contact point A in the axial direction, relative to a width Wt of the tread in the axial direction is not less than 25% and not greater than 40%.

Furthermore, the present invention is directed to a method for manufacturing a pneumatic tire including: a tread that forms a tread surface which comes into contact with a road surface; and a band disposed inward of the tread in a radial direction. The band includes a center portion disposed at a center in an axial direction, and a shoulder portion disposed outward of the center portion in the axial direction. The manufacturing method includes the step of layering the band. In the step of layering the band, a strip having a cord is helically wound at a pitch Ps that is not less than 0.8 times a width W of the strip and not greater than 1.2 times the width W, in the shoulder portion. The strip having the cord is helically wound at a pitch Pc that is not less than 2.0 times the width W of the strip and not greater than 2.5 times the width W, in the center portion.

DESCRIPTION OF THE PREFERRED EMBODIMENTS

The following will describe in detail the present invention based on preferred embodiments with reference where appropriate to the accompanying drawing.

Figure 1:
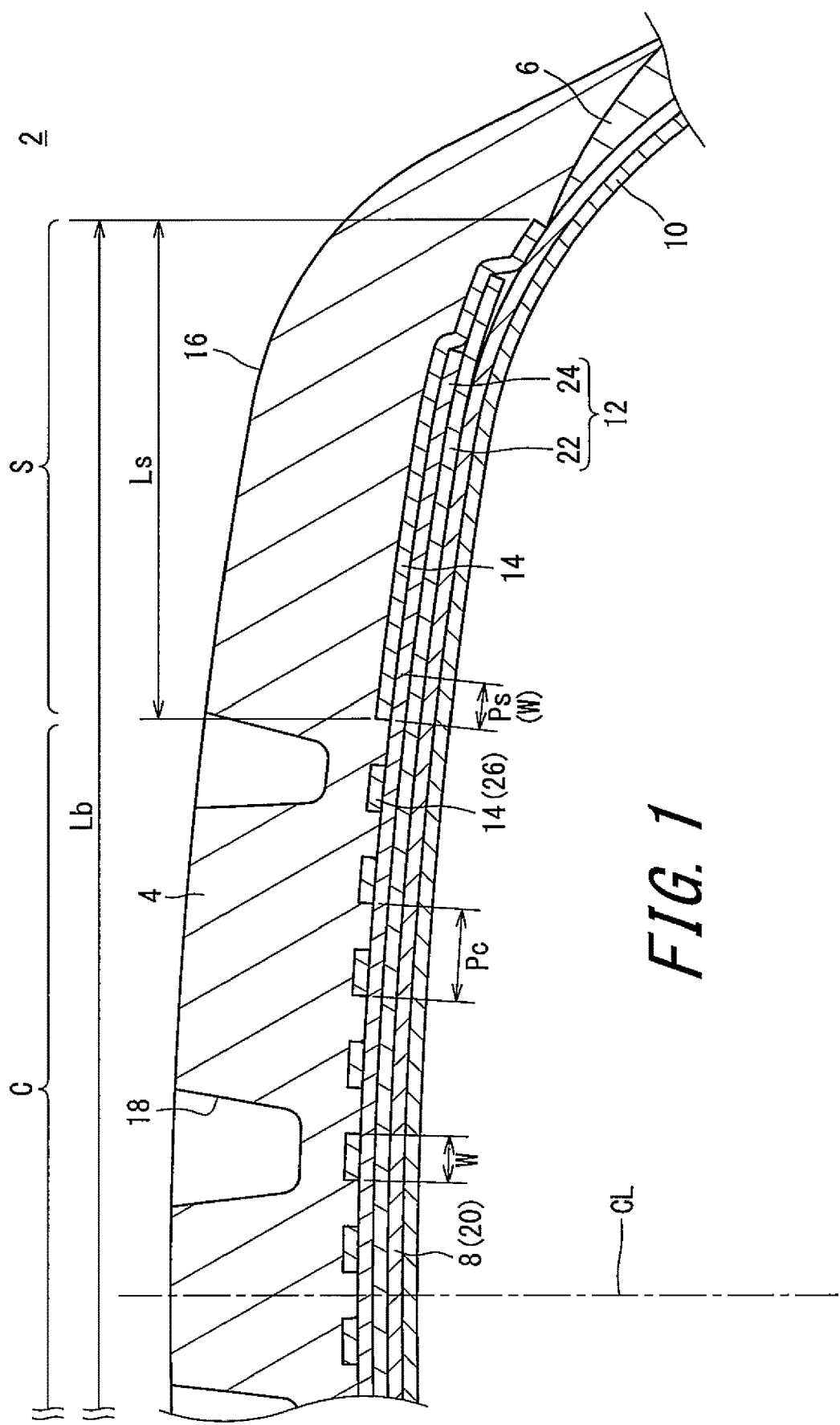
FIG. 1 is a cross-sectional view of a part of a pneumatic tire according to an embodiment of the present invention.

FIG. 1 shows a pneumatic tire 2. A tread portion of the tire 2 is shown in FIG. 1. In FIG. 1, the up-down direction represents the radial direction, the left-right direction represents the axial direction, and the direction perpendicular to the surface of the drawing sheet represents the circumferential direction. In FIG. 1, an alternate long and short dash line CL represents the equator plane of the tire 2. The shape of the tire 2 is symmetric about the equator plane CL except for a tread pattern. The tire 2 is of a tubeless type.

The tire 2 includes a tread 4, a pair of sidewalls 6, a carcass 8, an inner liner 10, a belt 12, and a band 14. In addition thereto, the tire 2 includes a pair of clinches, a pair of beads, and a pair of chafers, which are not shown.

The tread 4 has a shape that projects outward in the radial direction. The tread 4 forms a tread surface 16 that comes into contact with a road surface. The tread 4 has grooves 18 formed therein. A tread pattern is formed by the grooves 18.

The tread 4 includes a base layer and a cap layer, which are not shown. The cap layer is disposed outward of the base layer in the radial direction. The cap layer is layered over the base layer. The base layer is formed of a crosslinked rubber which has an excellent adhesiveness. A typical base rubber of the base layer is natural rubber. The cap layer is formed from a crosslinked rubber which exhibits excellent wear resistance, heat resistance, and grip performance.

Each sidewall 6 extends almost inward from the end of the tread 4 in the radial direction. The sidewall 6 is formed from crosslinked rubber. The sidewall 6 is deformed to absorb impact from a road surface. The sidewall 6 prevents damage to the carcass 8.

The carcass 8 includes a carcass ply 20. The carcass ply 20 is extended on and between the beads on both sides, along the tread 4 and the sidewall 6. The carcass ply 20 is turned up around cores of the beads, which is not shown.

The carcass ply 20 includes multiple cords aligned with each other, and topping rubber, which is not shown. An absolute value of an angle of each cord relative to the equator plane CL is from 65° to 90°. In other words, the carcass 8 forms a radial structure. The cord is formed from an organic fiber. Preferable examples of the organic fiber include polyester fibers, nylon fibers, rayon fibers, polyethylene naphthalate fibers, and aramid fibers. The carcass 8 may include two or more carcass plies 20.

The inner liner 10 is disposed inward of the carcass 8. The inner liner 10 is joined to the inner surface of the carcass 8. The inner liner 10 is formed from a crosslinked rubber having excellent airtightness. The inner liner 10 maintains the internal pressure of the tire 2.

The belt 12 is disposed inward of the tread 4 in the radial direction. The belt 12 is layered over the carcass 8. The belt 12 reinforces the carcass 8. The belt 12 includes an inner layer 22 and an outer layer 24. As is apparent from FIG. 1, the width of the inner layer 22 is slightly greater than the width of the outer layer 24 in the axial direction. The inner layer 22 and the outer layer 24 each include multiple cords aligned with each other, and topping rubber, which is not shown. Each cord is tilted relative to the equator plane CL. An absolute value of the tilt angle is typically not less than 10° and not greater than 35°. A direction in which the cords of the inner layer 22 are tilted relative to the equator plane CL is opposite to a direction in which the cords of the outer layer 24 are tilted relative to the equator plane CL. A preferable material of the cord is steel. An organic fiber may be used for the cord. The width, in the axial direction, of the belt 12 is preferably not less than 0.7 times the maximal width of the tire 2. The belt 12 may include three or more layers.

The band 14 is disposed inward of the tread 4 in the radial direction. The band 14 is disposed outward of the belt 12 in the radial direction. The band 14 is layered over the belt 12. The band 14 can contribute to stiffness, in the radial direction, of the tire 2.

As shown in FIG. 1, the band 14 includes a center portion C and shoulder portions S. The center portion C is disposed at the center in the axial direction. The center portion C intersects the equator plane CL. The shoulder portion S is disposed outward of the center portion C in the axial direction. In the present embodiment, a pair of shoulder portions S are disposed on both outer sides of the center portion C. The outer end of the shoulder portion S is the outer end of the band 14, in the axial direction.

Figure 2:
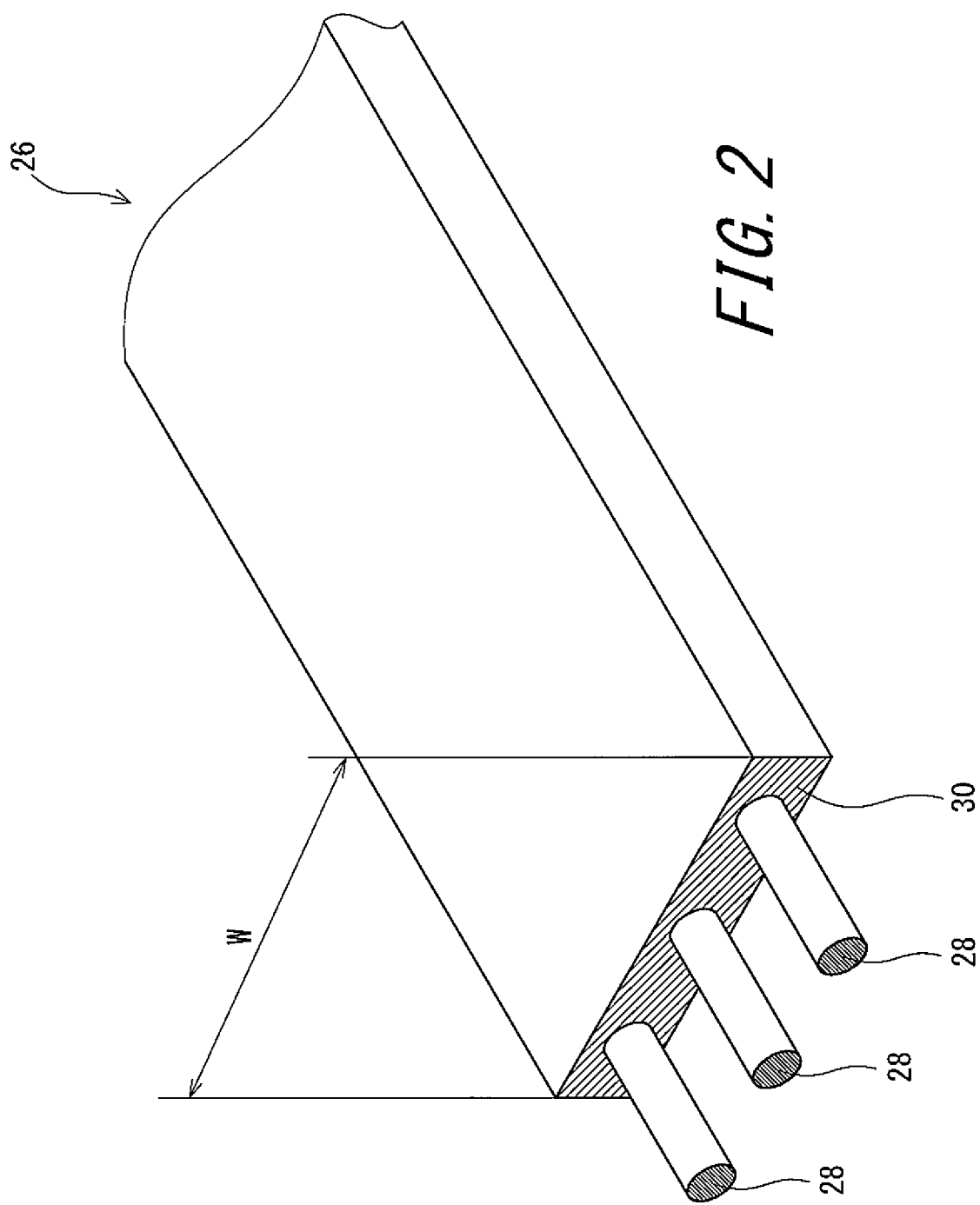
FIG. 2 is a perspective cross-sectional view of a strip that forms a band of the tire shown in FIG. 1.

As described below, the band 14 is formed from a strip 26. FIG. 2 is a perspective cross-sectional view of the strip 26. The strip 26 includes cords 28. In the example shown in FIG. 2, the number of the cords 28 included in the strip 26 is three. The strip 26 includes the cords 28 and a topping rubber 30. A preferable material of the cord 28 is an organic fiber. Preferable examples of the organic fiber include nylon fibers, polyester fibers, rayon fibers, polyethylene naphthalate fibers, and aramid fibers. Steel may be used for the cord 28.

The band 14 has a helically wound structure in which the strip 26 is wound in the circumferential direction. That is, in the band 14, each cord 28 is helically wound. The band 14 has a so-called jointless structure. The cross-section of the band 14 shown in FIG. 1 is a cross-section of the strip 26 that has been wound. In the cross-sectional view of the band 14, the cords 28 are not shown. As shown in FIG. 1, in the center portion C, gaps are formed between the cross-sections of the strip 26. In the present embodiment, in the shoulder portion S, no gaps are formed between the cross-sections of the strip 26. That is, in the tire 2, a pitch of the strip 26 in the center portion C is greater than a pitch of the strip 26 in the shoulder portion S. In other words, in the tire 2, the density of the cords 28 in the center portion C is less than the density of the cords 28 in the shoulder portion S.

In FIG. 1, a double-headed arrow Pc represents a pitch of the strip 26 in the center portion C. In FIG. 1 and FIG. 2, a double-headed arrow W represents a width of the strip 26. In the tire 2, the pitch Pc of the strip 26 in the center portion C, is not less than 2.0 times the width W of the strip 26 and not greater than 2.5 times the width W. That is, a ratio (Pc/W) of the pitch Pc to the width W is not less than 2.0 and not greater than 2.5.

In FIG. 1, a double-headed arrow Ps represents a pitch of the strip 26 in the shoulder portion S. In the tire 2, the pitch Ps of the strip 26 in the shoulder portion S is not less than 0.8 times the width W of the strip 26 and not greater than 1.2 times the width W. That is, a ratio (Ps/W) of the pitch Ps to the width W is not less than 0.8 and not greater than 1.2. In the embodiment shown in FIG. 1, the pitch Ps is equal to the width W of the strip 26. That is, the ratio (Ps/W) is 1.0.

Hereinafter, a method for manufacturing the tire 2 will be described. The method for manufacturing the tire 2 includes a step (referred to as forming step) of obtaining a raw cover, and a step (referred to as vulcanization step) of vulcanizing the raw cover to obtain the tire 2.

In the forming step, the components, of the tire 2, such as the carcass 8, the belt 12, and the band 14 are layered on the outer surface of a drum (not shown) of a former. The forming step includes a step of layering the band 14. In the step of layering the band 14, the band 14 is layered outward of the belt 12. In the forming step, these components of the tire 2 have not yet been vulcanized. These components are not the same as the components obtained after the vulcanization step. For example, the topping rubber 30 of the band 14 which is layered in the forming step has not yet been vulcanized. Through the vulcanization step, the band 14 having the topping rubber 30 having been vulcanized can be obtained. In the description herein, the component which has not yet been subjected to the vulcanization step and the component which has been subjected to the vulcanization step are called by the same name. These components are called by the same name as "band 14". The same applies to the other components. The same applies to the strip 26.

The step of layering the band 14 includes a step of preparing the strip 26 and a step of helically winding the strip 26. In the step of preparing the strip 26, the plurality of the cords 28 are extruded together with the topping rubber 30, to obtain the band-shaped strip 26. The strip 26 is supplied to the former.

Figure 3:
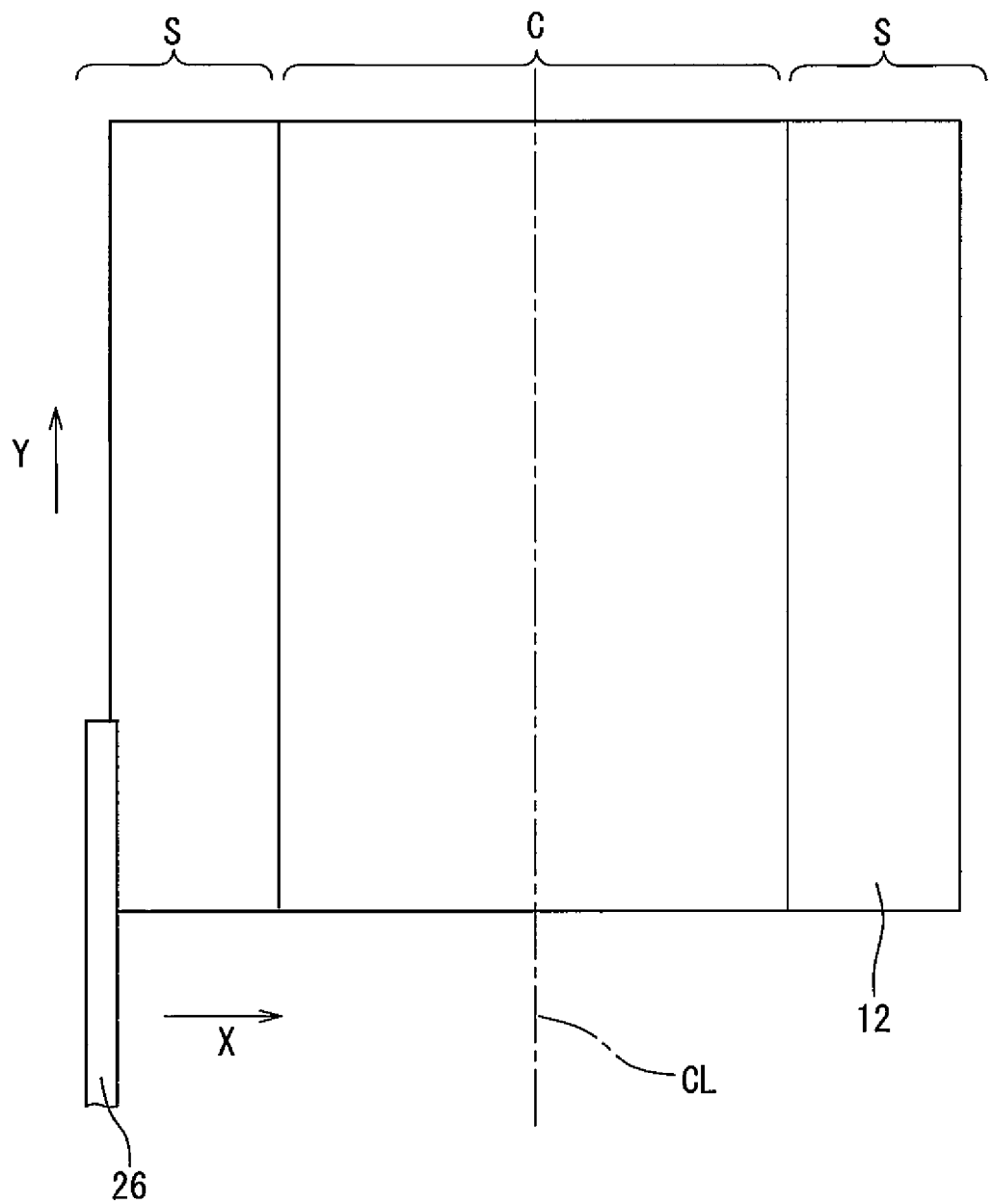
FIG. 3 is a plan view illustrating a state where the band shown in FIG. 1 is being layered.

In the step of helically winding the strip 26, the strip 26 is wound on the outer side of the belt 12. FIG. 3 is a plan view illustrating a state at the start of the step of helically winding the strip 26. In FIG. 3, the up-down direction represents the circumferential direction, the left-right direction represents the axial direction, and the direction perpendicular to the surface of the drawing sheet represents the radial direction. The equator plane CL of the tire 2 that is manufactured by using the manufacturing method, the center portion C and the shoulder portions S of the band 14 of the tire 2 are also shown. The belt 12 which has been already layered around the drum is also shown. The former has a head, which is not shown. The head feeds the strip 26 and is movable in the axial direction.

In this step, the leading end of the strip 26 fed by the head is firstly disposed at a position of the outer end of one of the shoulder portions S. Next, the drum is rotated in the direction indicated by an arrow Y shown in FIG. 3. Simultaneously when rotation of the drum is started, the head is moved in the direction indicated by an arrow X shown in FIG. 3 while feeding the strip 26. The head is moved from the outer side toward the inner side in the axial direction. While the drum is rotated, the head is moved. Therefore, the strip 26 is helically wound. At this time, a speed at which the head is moved is set such that the pitch Ps of the strip 26 is 0.8 times to 1.2 times the width W of the strip 26. In other words, a feed amount of the strip 26 is set so as to be 0.8 times to 1.2 times the width W of the strip 26. When the head reaches a position of a boundary between the shoulder portion S and the center portion C, the speed at which the head is moved is increased. In the center portion C, the speed at which the head is moved is set such that the pitch Pc of the strip 26 is 2.0 times to 2.5 times the width W of the strip 26. In other words, the feed amount of the strip 26 is set so as to be 2.0 times to 2.5 times the width W of the strip 26. When the head reaches a position of a boundary between the center portion C and the other of the shoulder portions S, the speed at which the head is moved is reduced. The speed at which the head is moved is set such that the pitch Ps of the strip 26 is 0.8 times to 1.2 times the width W of the strip 26. The head reaches a position of the outer end of the shoulder portion S. The strip 26 is wound to the position of the outer end of the shoulder portion S. Thus, the band 14 is layered outward of the belt 12.

In the above-described manufacturing method, the strip 26 is wound by using one head. The former may have two heads, and the strip 26 may be helically wound from the center (center of the center portion C) of the band 14 to one of the ends by using one of the heads, and the strip 26 may be helically wound from the center of the band 14 to the other of the ends by using the other of the heads. Also in this case, the speed at which each head is moved is set such that the pitch Pc of the strip 26 in the center portion C is 2.0 times to 2.5 times the width W of the strip 26, and the pitch Ps of the strip 26 in each shoulder portion S is 0.8 times to 1.2 times the width W of the strip 26.

After the band 14 is layered, the tread 4 is further layered over the band 14, to obtain a raw cover (also referred to as unvulcanized tire).

In the vulcanization step, the raw cover is pressurized and heated in a cavity formed between a mold and a bladder. Thus, crosslinking reaction is caused in the rubber, to obtain the tire 2.

In the manufacturing method described above, a drum is used. In the forming step, the components of the tire 2 may be layered around a rigid core. In this case, in the vulcanization step, the raw cover is pressurized and heated in a cavity formed between the mold and the rigid core.

Hereinafter, the action and effect of the present invention will be described.

The inventors have studied the structure of the band. As a result, the inventors have found that, when a pitch of the strip of the band at the center in the axial direction, and a pitch of the strip at the end side in the axial direction are made appropriate, ride comfort and steering stability are improved. In the band 14, the pitch Pc of the strip 26 having the cords 28 is not less than 2.0 times the width W of the strip 26 and not greater than 2.5 times the width W, in the center portion C disposed at the center in the axial direction. The pitch Pc is wider than a pitch of a strip of a conventional tire. Stiffness of the tire 2 is appropriately reduced by the center portion C. The tire 2 effectively absorbs impact from a road surface. The tire 2 provides excellent ride comfort. In the shoulder portion S disposed outward of the center portion C in the axial direction, the pitch Ps of the strip 26 is not less than 0.8 times the width W of the strip 26 and not greater than 1.2 times the width W. The structures of the center portion C and the shoulder portion S effectively contribute to steering stability. The band 14 effectively contributes to ride comfort and steering stability exhibited by the tire 2. The tire 2 provides excellent ride comfort and steering stability.

From the viewpoint of more effective contribution to ride comfort and steering stability, the pitch Pc of the strip 26 in the center portion C is more preferably not less than 2.1 times the width W of the strip 26, and more preferably not greater than 2.4 times the width W.

As described above, in the band 14, the pitch Pc of the strip 26 in the center portion C is wider than a pitch of a strip of a conventional tire. In the tire 2, the quantity of the strip 26 required to form the band 14 is small. This contributes to reduction of production cost of the tire 2. The production cost of the tire 2 is small.

In FIG. 1, a double-headed arrow Lb represents a width of the band 14. The width Lb represents a distance between both ends of the band 14 in the axial direction. A double-headed arrow Ls represents a width, in the axial direction, of the shoulder portion S. In the tire 2, the width Ls of the shoulder portion S is preferably not greater than 30% of the width Lb of the band 14. That is, a ratio (Ls/Lb) of the width Ls to the width Lb is preferably not greater than 30%. Thus, the center portion C effectively contributes to improvement of ride comfort. The tire 2 provides excellent ride comfort. In this viewpoint, the ratio (Ls/Lb) is more preferably not greater than 25%. The width Ls of the shoulder portion S is preferably not less than 16% of the width Lb of the band 14. That is, the ratio (Ls/Lb) is preferably not less than 16%. Thus, the band 14 contributes to steering stability. The tire 2 provides excellent steering stability. In this viewpoint, the ratio (Ls/Lb) is more preferably not less than 20%.

The pitch Pc of the strip 26 in the center portion C is preferably uniform over the entirety of the center portion C. When the pitch Pc is uniform, the ground contact shape of the tire 2 is inhibited from being deformed. The ground contact shape of the tire 2 is appropriately maintained. This contributes to ride comfort and steering stability. The tire 2 allows achievement of excellent ride comfort and steering stability.

The pitch Ps of the strip 26 in the shoulder portion S is preferably uniform over the entirety of the shoulder portion S. When the pitch Ps is uniform, the ground contact shape of the tire 2 is inhibited from being deformed. The ground contact shape of the tire 2 is appropriately maintained. This contributes to ride comfort and steering stability. The tire 2 allows achievement of excellent ride comfort and steering stability.

The width W of the strip 26 is preferably not less than 5 mm. When the width W is not less than 5 mm, the band 14 can be formed with the reduced number of windings. The productivity of the tire 2 is excellent. The width W is preferably not greater than 15 mm. When the width W is not greater than 15 mm, the strip 26 can be used for forming various sizes of the bands 14. This contributes to productivity of the tire 2.

In the present invention, the outline of the outer surface of the tire 2 is referred to as profile. In a case where the groove 18 or a projection is formed on the outer surface, the profile is represented by using an imaginary outer surface obtained on the assumption that the groove 18 and the projection are not formed.

Figure 4:
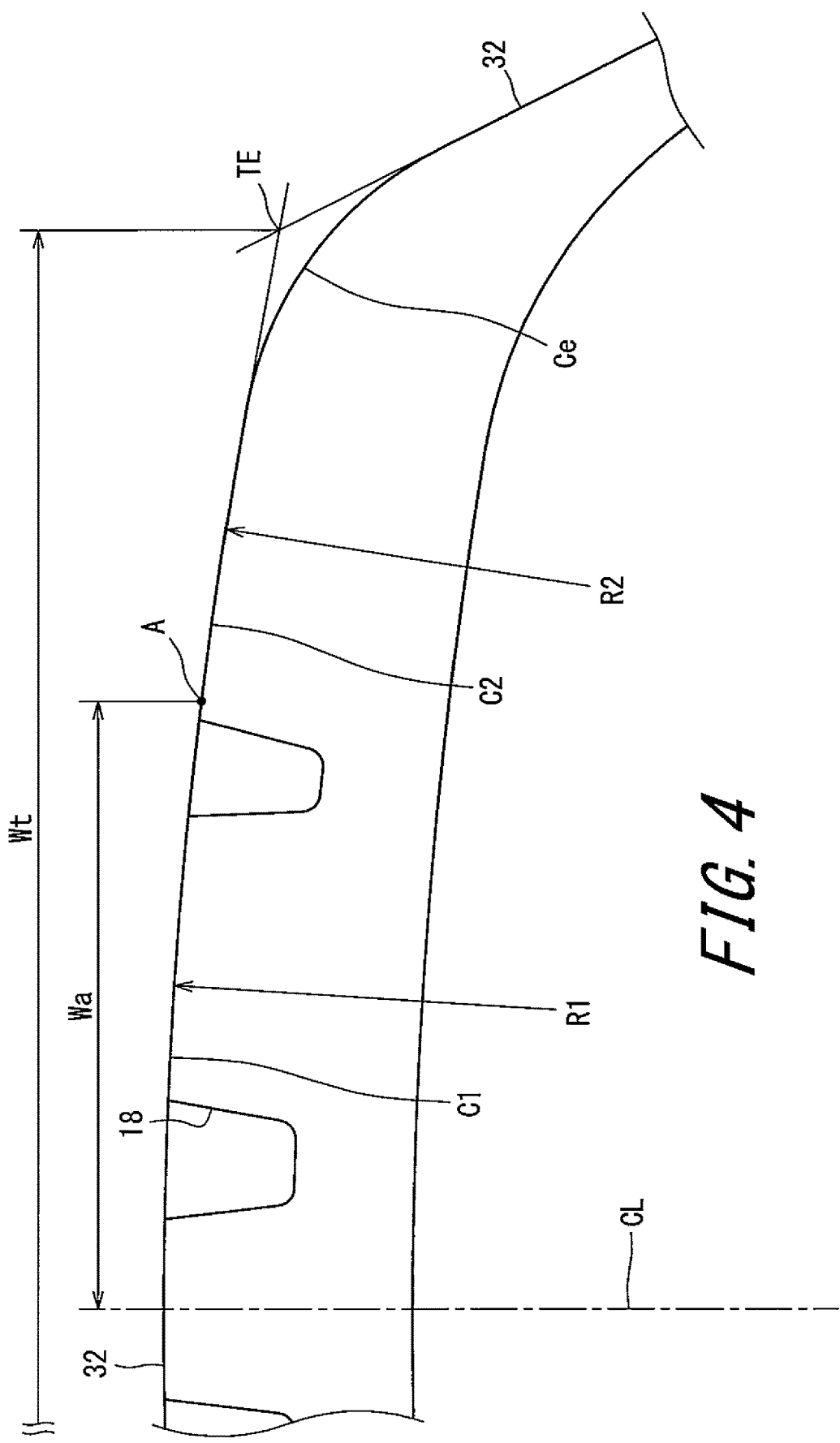
FIG. 4 illustrates an outline of the tire shown in FIG. 1.

FIG. 4 shows a profile 32 of the tire 2 shown in FIG. 1 together with the groove 18. In the present invention, the dimensions and angles for the profile 32 are obtained on the basis of the cavity surface of the mold. In FIG. 4, the up-down direction represents the radial direction of the tire 2, the left-right direction represents the axial direction of the tire 2, and the direction perpendicular to the surface of the drawing sheet represents the circumferential direction of the tire 2.

As shown in FIG. 4, in the present embodiment, the profile 32 of the tread surface 16 includes a first arc C1 that intersects the equator plane CL and a second arc C2 that contacts with the first arc C1. In FIG. 4, reference character A represents a contact point at which the arc C1 and the arc C2 contact with each other. That is, the arc C1 and the arc C2 have a common tangent line at the contact point A.

A ratio (R1/R2) of a curvature radius R1 of the first arc C1 to a curvature radius R2 of the second arc C2, is preferably not less than 210%. When the ratio (R1/R2) is not less than 210%, a ground contact area can be increased. This contributes to cornering power. This contributes to responsiveness of the tire 2. Also in the tire 2 in which the pitch Pc is greater than a pitch of a strip of a conventional tire, steering stability is advantageously achieved. In this viewpoint, the ratio (R1/R2) is more preferably not less than 220%. The ratio (R1/R2) is preferably not greater than 250%. When the ratio (R1/R2) is not greater than 250%, the ground contact width is appropriately reduced. In the tire 2, a sufficient ground contact length can be assured. The tire 2 exhibits an excellent grip force. The tire 2 provides excellent steering stability. In this viewpoint, the ratio (R1/R2) is more preferably not greater than 240%.

As shown in FIG. 4, the profile 32 of the tire 2 at the radially outer side surface is a curved line that extends almost in the axial direction. The profile 32 of the tire 2 at the axially outer side surface is a curved line that extends almost in the radial direction. In the profile 32 of the tire 2, an arc Ce having a curvature radius that is less than curvature radii of portions therearound is disposed between the curved line that extends almost in the axial direction and the curved line that extends almost in the radial direction. In FIG. 2, reference character TE represents a point of intersection of the tangent line at one of ends of the arc Ce and the tangent line at the other of the ends of the arc Ce. In the description herein, a distance, in the axial direction, between the point TE of intersection on one side and the point TE of intersection on the other side is the width of the tread 4. In FIG. 4, a double-headed arrow Wt represents the width of the tread 4.

In FIG. 4, a double-headed arrow Wa represents a distance, in the axial direction, from the equator plane CL to the contact point A. A ratio (Wa/Wt) of the distance Wa to the width Wt is preferably not less than 25%. When the ratio (Wa/Wt) is not less than 25%, the ground contact area can be increased. This contributes to cornering power. This contributes to responsiveness. Also in the tire 2 in which the pitch Pc is greater than a pitch of a strip of a conventional tire, steering stability is advantageously achieved. In this viewpoint, the ratio (Wa/Wt) is more preferably not less than 30%. The ratio (Wa/Wt) is preferably not greater than 40%. When the ratio (Wa/Wt) is not greater than 40%, the ground contact width is appropriately reduced. In the tire 2, a sufficient ground contact length can be assured. The tire 2 exhibits excellent grip force. The tire 2 provides excellent steering stability. In this viewpoint, the ratio (Wa/Wt) is more preferably not greater than 35%.

As shown in FIG. 1, the tire 2 includes no edge bands. The band 14 of the tire 2 is a full band 14 formed from one layer. Thus, the tire 2 is preferably structured such that the tire 2 includes no edge bands, and the band 14 is a full band 14 formed from one layer. As described above, in the tire 2, since the pitch of the strip 26 at each of the center portion C and the shoulder portion S is appropriately set, and the outer surface of the tread 4 has the appropriate profile 32, even when no edge bands are provided, steering stability is advantageously achieved. When no edge bands are provided, stiffness of the tire 2 can be more appropriately reduced. This contributes to ride comfort. When no edge bands are provided, the production cost of the tire 2 can be reduced. In the tire 2, ride comfort and steering stability are advantageously achieved and, simultaneously, production cost can be reduced.

In the present invention, the dimensions and angles of the components of the tire 2 are measured in a state where the tire 2 is mounted on a normal rim, and the tire 2 is inflated with air to a normal internal pressure, unless otherwise specified. During the measurement, no load is applied to the tire 2. In the description herein, the normal rim represents a rim which is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Example 1

A pneumatic tire having the structure shown in FIG. 1 was produced. The size of the tire was "195/65R15 91H". The specifications of the tire are indicated in Table 1. The band of the tire was structured as a full band formed from one layer. This is indicated as "1FB" in the cell for "structure of band". In the tire, the pitch Pc of the strip in the center portion was uniform. This is indicated as "Yes" in the cell for uniformity of pitch Pc in Table 1. In the tire, the pitch Ps of the strip in the shoulder portion was also uniform, which is not indicated in the table. In the tire, the width Ls of the shoulder portion was 23% of the width Lb of the band. The ratio (Wa/Wt) was 32%. In the tire, the curvature radius R1 was 540 mm. In the tire, the width W of the strip was 10 mm and the number of the cords of the strip was five.

Comparative Example 1

A tire of comparative example 1 was obtained in the same manner as in example 1 except that the pitch Pc was equal to the width W of the strip and the ratio (R1/R2) was as indicated in Table 1. In the band, there was no difference between the pitch in the center portion and the pitch in the shoulder portion. This is a conventional tire.

Comparative Example 2

A tire of comparative example 2 was obtained in the same manner as in example 1 except that the pitch Pc and the ratio (R1/R2) were as indicated in Table 1. This is a conventional tire.

Comparative Example 3

A tire of comparative example 3 was obtained in the same manner as in comparative example 2 except that the tire of comparative example 3 further included edge bands each formed from one layer. This is a conventional tire. That the tire included edge bands each formed from one layer in addition to a full band formed from one layer, is indicated as "1FB+1EB" in the cell for "structure of band".

Comparative Example 4

A tire of comparative example 4 was obtained in the same manner as in comparative example 2 except that the pitches Pc of a strip in a center portion were not uniform. That the pitches Pc were not uniform, is indicated as "No" in the cell for uniformity of pitch Pc. In the center portion of the tire, a pitch near the center in the axial direction was narrower than a pitch near the outer side in the axial direction. A value of a ratio of an average pitch of all the pitches in the center portion, relative to the width W of the strip, is indicated in the cell for ratio (Pc/W).

Examples 2 to 3, Comparative Example 5

Tires of examples 2 to 3 and comparative example 5 were each obtained in the same manner as in example 1 except that the pitch Pc was changed and the ratio (Pc/W) was as indicated in Table 2.

Examples 4 to 5

Tires of examples 4 to 5 were each obtained in the same manner as in example 1 except that the curvature radius R1 was changed and the ratio (R1/R2) was as indicated in Table 2.

[Cost]

A reciprocal of cost that was required for producing the band of each sample tire is indicated below as an index in Tables 1 to 2. The greater the value is, the less the cost is. The greater the value is, the better the evaluation is.

[Ride Comfort, Steering Stability]

Each sample tire was mounted on a standard rim (size=15×6.0 J), and was inflated with air to an internal pressure of 230 kPa. The tires were mounted to all the four wheels of a commercially available passenger car having an engine displacement of 1800 cc. A driver was caused to drive this vehicle in a test course having an asphalt road surface, and was caused to make sensory evaluation for steering stability and ride comfort. The results are indicated below as indexes in Tables 1 to 2. The greater the value is, the better the evaluation is.

TABLE 1

Evaluation result

| | Comparative example 1 | Comparative example 2 | Comparative example 3 | Comparative example 4 | Example 1 |
|---|---|---|---|---|---|
| Structure of band | 1FB | 1FB | 1FB + 1EB | 1FB | 1FB |
| Ratio (Pc/W) | 1.0 | 1.4 | 1.4 | 1.4 | 2.3 |
| Ratio (Ps/W) | 1.0 | 1.0 | 1.0 | 1.0 | 1.0 |
| Uniformity of pitch Pc | Yes | Yes | Yes | No | Yes |
| Ratio (R1/R2) | 200 | 200 | 200 | 200 | 220 |
| Cost | 90 | 93 | 83 | 95 | 102 |
| Ride comfort | 97 | 99 | 95 | 96 | 102 |
| Steering stability | 98 | 99 | 101 | 97 | 102 |

TABLE 2

Evaluation result

| | Example 2 | Example 3 | Comparative example 5 | Example 4 | Example 5 |
|---|---|---|---|---|---|
| Structure of band | FB | FB | FB | FB | FB |
| Ratio (Pc/W) | 2.0 | 2.5 | 2.7 | 2.3 | 2.3 |
| Ratio (Ps/W) | 1.0 | 1.0 | 1.0 | 1.0 | 1.0 |
| Uniformity of pitch Pc | Yes | Yes | Yes | Yes | Yes |
| Ratio (R1/R2) | 220 | 220 | 220 | 200 | 250 |
| Cost | 100 | 102 | 104 | 102 | 102 |
| Ride comfort | 101 | 102 | 103 | 102 | 102 |
| Steering stability | 101 | 102 | 98 | 100 | 101 |

As indicated in Tables 1 to 2, evaluation is higher in the tires of examples than in the tires of comparative examples. The evaluation result clearly indicates that the present invention is superior.

The tire described above is applicable to various vehicles.

The foregoing description is in all aspects illustrative, and various modifications can be devised without departing from the essential features of the invention.

What is claimed is:

1. A pneumatic tire comprising:
   a tread that forms a tread surface which comes into contact with a road surface; and
   a band disposed inward of the tread in a radial direction, wherein
   the band has a helically wound structure in which a strip having a cord is wound in a circumferential direction, the band includes a center portion disposed at a center in an axial direction, and a shoulder portion disposed outward of the center portion in the axial direction, a pitch Pc of the strip in the center portion is not less than 2.0 times a width W of the strip and not greater than 2.5 times the width W, a pitch Ps of the strip in the shoulder portion is not less than 0.8 times the width W of the strip and not greater than 1.2 times the width W, on a cross-section perpendicular to the circumferential direction, a profile of the tread surface has a first arc C1 that intersects an equator plane, and a second arc C2 that contacts with the first arc C1, a ratio (R1/R2) of a curvature radius R1 of the first arc C1 to a curvature radius R2 of the second arc C2 is not less than 210% and not greater than 250%, and when A represents a contact point at which the first arc C1 and the second arc C2 contact with each other, and the contact point A is disposed outward of a boundary of the center portion and the shoulder portion in an axial direction.

2. The tire according to claim 1, wherein
the band is a full band formed from one layer.

3. The tire according to claim 1, wherein
the ratio (R1/R2) is not greater than 220%.

4. The tire according to claim 1, wherein
a ratio (Wa/Wt) of a distance Wa from the equator plane to the contact point A in the axial direction, relative to a width Wt of the tread in the axial direction is not less than 30% and not greater than 40%.

5. The tire according to claim 1, wherein
the strip includes a steel cord.

6. A pneumatic tire comprising:
a tread that forms a tread surface which comes into contact with a road surface; and
a band disposed inward of the tread in a radial direction; and
a belt disposed inward of the band in a radial direction, wherein the band has a helically wound structure in which a strip having a cord is wound in a circumferential direction, the band includes a center portion disposed at a center in an axial direction, and a shoulder portion disposed outward of the center portion in the axial direction, a pitch Pc of the strip in the center portion is not less than 2.1 times a width W of the strip and not greater than 2.3 times the width W, a pitch Ps of the strip in the shoulder portion is not less than 0.8 times the width W of the strip and not greater than 1.2 times the width W, an outer end of the band is disposed outward of a corresponding outer end of the belt in an axial direction, the band is a full band formed from one layer, on a cross-section perpendicular to the circumferential direction, a profile of the tread surface has a first arc C1 that intersects an equator plane, and a second arc C2 that contacts with the first arc C1, a ratio (R1/R2) of a curvature radius R1 of the first arc C1 to a curvature radius R2 of the second arc C2 is not less than 210% and not greater than 220%, the tread has grooves formed therein, when A represents a contact point at which the first arc C1 and the second arc C2 contact with each other, the contact point A is disposed outward of a boundary of the center portion and the shoulder portion in an axial direction;

a width Ls of the shoulder portion is not less than 16% of a width Lb of the band and not greater than 30% of the width Lb, in the axial direction;

the pitch Pc of the strip in the center portion is uniform; and a ratio (Wa/Wt) of a distance Wa from the equator plane to the contact point A in the axial direction, relative to a width Wt of the tread in the axial direction is not less than 30% and not greater than 40%.

7. The tire according to claim 6, wherein
the strip includes a steel cord.

* * * * *